United States Patent
Ewert et al.

(10) Patent No.: US 9,802,649 B2
(45) Date of Patent: Oct. 31, 2017

(54) BODY PART OF A VEHICLE

(71) Applicant: Dr. Ing. h.c. F. Porsche Aktiengesellschaft, Stuttgart (DE)

(72) Inventors: Eduard Ewert, Karlsruhe (DE); Ralf Keller, Niefern-Oeschelbronn (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/208,620

(22) Filed: Jul. 13, 2016

(65) Prior Publication Data

US 2017/0029030 A1    Feb. 2, 2017

(30) Foreign Application Priority Data

Jul. 30, 2015   (DE) .......................... 10 2015 112 496

(51) Int. Cl.
| | |
|---|---|
| *B62D 21/15* | (2006.01) |
| *B62D 29/00* | (2006.01) |
| *B62D 27/02* | (2006.01) |

(52) U.S. Cl.
CPC .............. *B62D 21/15* (2013.01); *B62D 27/02* (2013.01); *B62D 29/008* (2013.01)

(58) Field of Classification Search
CPC ....... B62D 21/15; B62D 29/008; B62D 27/02
USPC .......... 296/187.09, 187.11, 30; 293/132, 155
See application file for complete search history.

(56) References Cited

U.S. PATENT DOCUMENTS

| | | | |
|---|---|---|---|
| 3,848,886 A | 11/1974 | Feustel et al. | |
| 4,929,008 A * | 5/1990 | Esfandiary | ............. B60R 19/20 188/376 |
| 6,010,155 A * | 1/2000 | Rinehart | ................ B62D 21/02 280/781 |
| 6,056,351 A * | 5/2000 | Braitmaier | ............... B60J 5/042 296/187.03 |
| 6,302,458 B1 * | 10/2001 | Wang | ...................... B60R 19/40 293/119 |
| 9,168,883 B1 | 10/2015 | Midoun et al. | |
| 2005/0104391 A1 * | 5/2005 | Browne | .................. B60R 19/03 293/132 |
| 2006/0022473 A1 * | 2/2006 | Hansen | ................... B60R 19/34 293/133 |

(Continued)

FOREIGN PATENT DOCUMENTS

| | | |
|---|---|---|
| DE | 10340955 A1 | 5/2005 |
| DE | 102012221194 A1 | 6/2014 |

(Continued)

*Primary Examiner* — Jason S Morrow
*Assistant Examiner* — E Turner Hicks
(74) *Attorney, Agent, or Firm* — Leydig, Voit & Mayer, Ltd.

(57) ABSTRACT

A body part of a vehicle includes a structural component and a deformation component. A connecting component is fastened to an end portion of the deformation component. The connecting component has a contact surface configured to come into contact with a mating contact surface of the structural component. A normal spacing is formed between the contact surface and the mating contact surface, and the connecting component is configured to form force-transmitting contact between the contact surface and the mating contact surface in the event of a crash.

10 Claims, 4 Drawing Sheets

(56) References Cited

U.S. PATENT DOCUMENTS

| | | | | |
|---|---|---|---|---|
| 2010/0066124 A1* | 3/2010 | Terada | ............... | B62D 21/152 296/187.09 |
| 2013/0119682 A1* | 5/2013 | Matuschek | ............ | B60R 19/34 293/133 |
| 2015/0246691 A1 | 9/2015 | Volz et al. | | |

FOREIGN PATENT DOCUMENTS

| | | |
|---|---|---|
| DE | 102013215064 A1 | 2/2015 |
| JP | H 05112254 A | 5/1993 |
| JP | 2014108773 A | 6/2014 |

\* cited by examiner

BODY PART OF A VEHICLE

CROSS-REFERENCE TO PRIOR APPLICATION

Priority is claimed to German Patent Application No. DE 10 2015 112 496.3, filed on Jul. 30, 2015, the entire disclosure of which is hereby incorporated by reference herein.

FIELD

The present invention relates to a body part of a vehicle and to a connecting component for use in such a body part.

BACKGROUND

It is known that a vehicle has individual body parts which form the body of the vehicle. Such body parts are frequently formed in a multipart manner and have in particular structural components. It is also known that, together with the structural components, provision is made of special deformation components which absorb and dissipate energy by way of their deformation in the event of a crash, and in this way represent a passive protective function for the driver of the vehicle.

A problem with the known body parts is that the connection between structural components and deformation components is relatively complex. In particular, this connection has to withstand even a crash in order that the corresponding dissipation of energy by the deformation of the deformation component is possible in the first place. To this end, high complexity is usually necessary in order to ensure that the deformation component and structural component are fastened together with the necessary security. This high structural complexity is accordingly usually also associated with a high weight and high level of intricacy.

SUMMARY

In an embodiment, the present invention provides a body part of a vehicle including a structural component and a deformation component. A connecting component is fastened to an end portion of the deformation component. The connecting component has a contact surface configured to come into contact with a mating contact surface of the structural component. A normal spacing is formed between the contact surface and the mating contact surface, and the connecting component is configured to form force-transmitting contact between the contact surface and the mating contact surface in the event of a crash.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
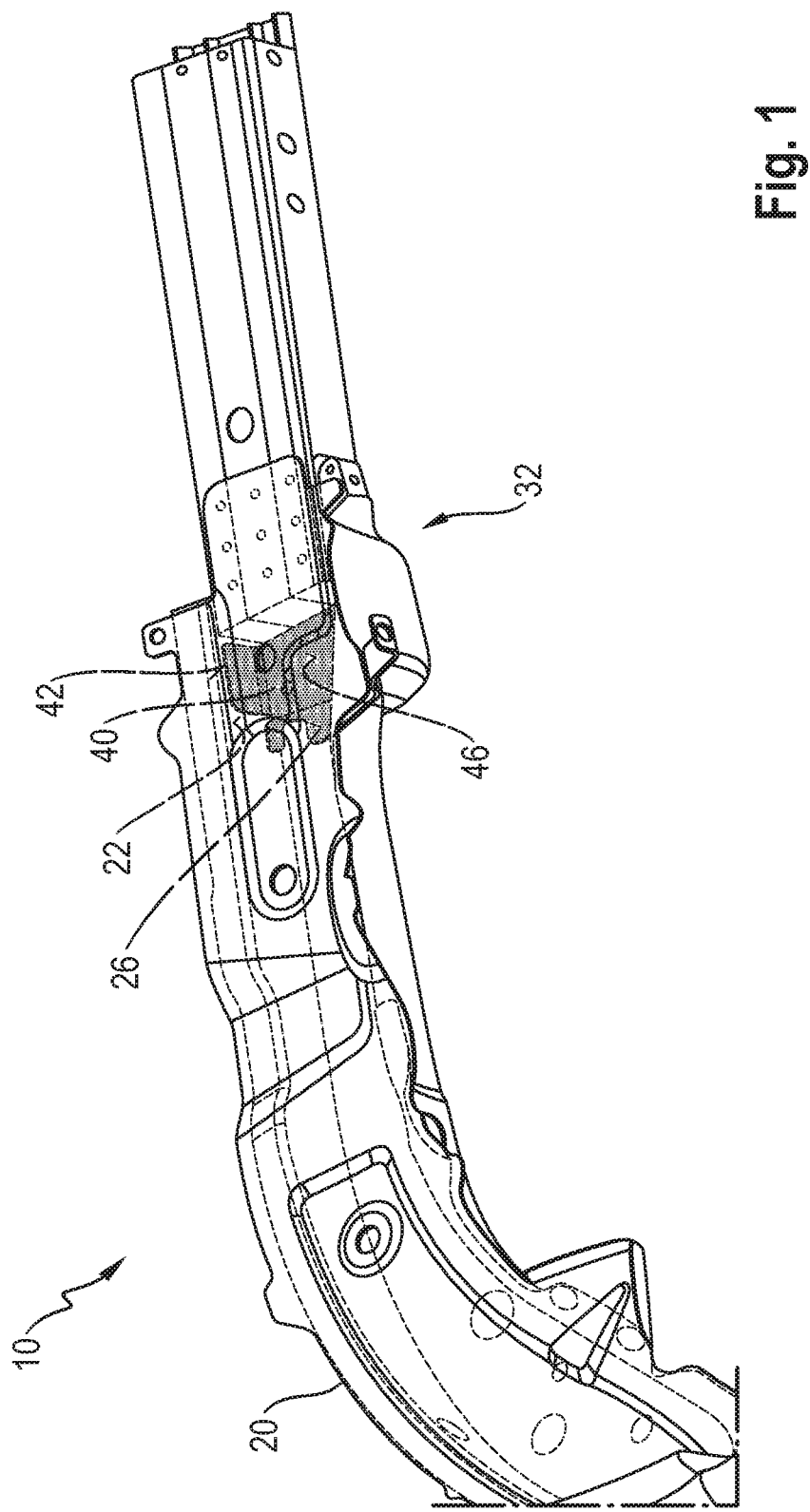
FIG. 1 shows an embodiment of a body part according to the invention.

In an embodiment, the present invention at least partially provides a remedy to the above-described disadvantages in a cost-effective and simple manner. In particular, an embodiment of the present invention allows the loading of the connecting point to be reduced in a cost-effective and simple manner such that a reduction in the level of intricacy and/or the weight of the body part is achievable with the same or even improved security.

In the following description, features and details which are described in conjunction with the body part according to embodiments of the invention also apply, of course, in conjunction with the connecting component according to embodiments of the invention and vice versa, such that reciprocal reference is or can always be made with respect to the disclosure of the individual aspects of embodiments of the invention.

Thus, according to an embodiment of the invention, provision is made of a body part of a vehicle which has a structural component and a deformation component. A connecting component is fastened to an end portion of the deformation component, said connecting component having a contact surface for coming into contact with a mating contact surface of the structural component. A body part according to an embodiment of the invention is characterized in that a normal spacing is formed between the contact surface and the mating contact surface. Furthermore, the connecting component is configured to form force-transmitting contact between the contact surface and the mating contact surface in the event of a crash.

Provision is thus made according to an embodiment of the invention for at least two different positions now to be able to be taken up with the aid of the connecting component. Under normal conditions, that is to say in the normal use situation of the vehicle, the mating contact surface and the contact surface are spaced apart from one another by the normal spacing. Thus, the contact surface and the mating contact surface do not touch one another under normal conditions. If a deformation is now introduced into the body part, i.e. if an excessive input of force that is greater than normal is present, a deformation begins first of all by a relative movement of the connecting component with respect to the structural component. The contact surface thus overcomes the normal spacing and comes into contact with the mating contact surface in the event of such a crash.

As a result of the contact between the contact surface and the mating contact surface in the event of a crash, the overall area which is present for force transmission between the structural component and the deformation component increases. Thus, an increased force transmission area is now available for this case and so the overall force transmission areas are subjected to less loading than would be the case in the event of force transmission only via a connection between the deformation component and structural component. The contact between the contact surface and mating contact surface and the increase, provided in this manner, of the force transmission area thus results directly in lowering of the force transmission between the deformation component and structural component. The deformation component and the structural component can in this case be connected together separately in very different manners. Simple plugging is sufficient in this case. However, adhesive connections, welded connections, plugged connections, screwed connections or riveted connections can also be provided within embodiments of invention, as will be explained later.

As a result of the provision of an additional supporting functionality in the event of a crash and a corresponding protective function for connecting functionalities between the structural component and deformation component, this fastening, provided separately from the connecting component, between the structural component and deformation component is in this way relieved of load and protected. This has the result that a force-transmitting connection that is provided between the structural component and the deformation component under normal conditions can be formed in a much lighter manner and with less complexity, since it has to provide the necessary force transmission functionality substantially only under normal conditions. Under crash conditions, after overcoming the normal spacing, the force transmission additionally provided between the contact surface and mating contact surface supports the already engaged force-transmitting connection between the structural component and deformation component, such that as a result of this support, the reduced mechanical stability of this connection no longer has an effect under crash conditions. This has the result that, in addition to a reduced level of intricacy and reduced weight, even a further improvement and increase in the security of the overall connection between the structural component and deformation component are achievable even in the event of a crash.

In this case, the connecting component is preferably fastened to the deformation component in a force-transmitting manner. Thus, in the event of a crash, the desired force transmission to the mating contact surface via the contact surface can be ensured. The connecting component can in this case be formed separately or integrally with the deformation component. As will be explained later, however, a separate formation of the connecting component is advantageous.

Within the meaning of the present invention, a deformation component is a component which, as part of the body part, deforms for energy absorption in the event of a crash. Such deformation components are provided, within embodiments of the present invention, in particular with the defined deformation properties that will be explained later. Thus, in this way, other body parts, in particular the structural component, are in particular protected from corresponding deformation in the event of a crash. The deformation components according to an embodiment of the present invention are in this case preferably designed for high energy absorption during deformation.

The structural component can be in particular a steel component. Thus, for example a steel crank or some other load-abutting structural component of the body is conceivable within embodiments of the present invention. The deformation component can be configured for example as an extruded profile which has in particular aluminum. Internal webs can provide a desired type of deformation or a desired deformation direction of such an extruded profile of the deformation component.

It may be advantageous when, in a body part according to an embodiment of the invention, the contact surface and the mating contact surface are configured for planar contact with one another. This means that the two surfaces, that is to say the contact surface and mating contact surface, can provide planar force transmission with one another. If the contact surface and mating contact surface are configured as flat surfaces, then they are accordingly preferably parallel to one another both when at the normal spacing and in the position in contact with one another. In addition to purely planar surfaces, however, more complex surfaces or curved surfaces are also conceivable for the contact surface and the mating contact surface. The contact surface and the mating contact surface are in this case configured preferably in a complementary manner in order to achieve the planar contact provided advantageously according to this embodiment. This results in much improved force transmission, since the desired force transmission can take place over a larger area.

It is furthermore advantageous when, in a body part according to an embodiment of the invention, the deformation component overlaps the structural component in the end portion of said deformation component. This should be understood as meaning that the deformation component is so to speak plugged at least partially into the structural component by way of the end portion. Thus, for example, the structural component can have a C-shaped cross section in which a corresponding hollow extruded profile of the deformation component is introduced. The overlap can be present partially or fully in the circumferential direction. Thus, an above-described C-shaped profile can be provided for example with a cover plate for the structural component for a closed cross section. In such a case, the deformation component is provided with an overlapping portion that is complete in the circumferential direction. As a result of the inward projection, additional support with respect to transverse forces is provided. Furthermore, the described normal spacing between the contact surface and the mating contact surface is protected from soiling or other blockages.

There can be a further advantage when, in a body part according to an embodiment of the invention, the connecting component is formed separately from the deformation component. The separate formation makes it possible to optimize the deformation component with regard to cost-effective and simple production. In particular, an extrusion functionality can now be provided such that the deformation component is able to be formed as an extruded profile. Since in particular a hollow extruded profile can be provided, in addition to a reduction in the costs and intricacy of the production of the deformation component, a reduction in the weight of this deformation component can also be achievable.

It is furthermore advantageous when, in a body part according to an embodiment of the invention, the structural component is connected to the deformation component independently of the connecting component. This results in the force transmission, already described in the introduction, under normal conditions, i.e. when the contact surface is not engaged with the mating contact surface. The structural component can now ensure force transmission to the deformation component and vice versa, via a corresponding connecting point. This force-transmitting connection can be provided for example by welding, adhesive bonding, riveting, screwing or a similar technical implementation of such a connecting functionality. In normal operation of the body part, the force transmission is provided exclusively or substantially exclusively via this connection between the structural component and deformation component.

There is a further advantage when, in a body part according to an embodiment of the invention, the contact surface has at least two contact surface portions which form in particular an acute angle between one another. Such contact surface portions thus serve to provide in particular mutual bracing such that a corresponding increase in the force transmission between the contact surface portions and corresponding mating contact surface portions is provided in the event of an increase in the introduced crash force. The contact surface portions can in this case transition into one another but can also be formed in a manner spaced apart from one another. A different orientation is preferably provided with regard to the surface normals of the two contact surface portions, such that for example a first contact surface portion is directed upward and a second contact surface portion is directed downward. If the contact between the contact surface portions and the mating contact surface is established as a result of the displacement with the normal spacing being overcome, this acute angled arrangement additionally produces a clamping action with a correspondingly increasing contact force during the deformation in the event of a crash.

It is furthermore advantageous when, in a body part according to an embodiment of the invention, the deformation component has lower mechanical stability than the structural component, in particular with a predetermined deformation direction and/or deformation type. This can be ensured in particular by the corresponding formation or choice of material of the deformation component. While the structural component is preferably formed from steel, the deformation component can be or have for example an extruded profile. In particular, aluminum is used as the construction material for the deformation component in order to be able to ensure this targeted dissipation of energy. In the case of minor crash situations, this preferably results in substantially only the deformation component being warped. Thus, the structural component can be protected and a repair can be carried out cost-effectively and easily by replacing the deformation component.

It is furthermore advantageous when, in a body part according to an embodiment of the invention, the connecting component has a guide surface which butts in a guiding manner against a mating guide surface of the structural component in order to guide the contact surface into contact with the mating contact surface in the event of a crash. In this case, forces are preferably not supported or only supported a little in normal operation. Rather, the guide surface butts against the mating guide surface in order also to ensure that tilting of the connecting component during the crash is avoided. Preferably, the guide surface and the corresponding mating guide surface are oriented, in an abutting embodiment, in the direction of a force characteristic in the event of a crash. This has the result that, both in normal operation and in the event of a crash, the guide surface is not able to be impaired by a force transmission functionality.

There is a further advantage when, in a body part according to an embodiment of the invention, the deformation component is configured as an extruded profile, in particular having aluminum. Such an extruded profile results in particularly simple and cost-effective production. Furthermore, a reduction in weight is possible in a cost-effective and simple manner as a result of the corresponding profile formation and in particular by the use of aluminum.

A connecting component for connecting a deformation component and a structural component so as to form a body part according to embodiments of the present invention, having a contact surface for coming into contact with a mating contact surface of the structural component, is likewise a subject of embodiments of the present invention. Accordingly, a connecting component according to embodiments of the invention provides the same advantages as have been explained in detail with regard to a body part according to embodiments the invention.

Figure 2:
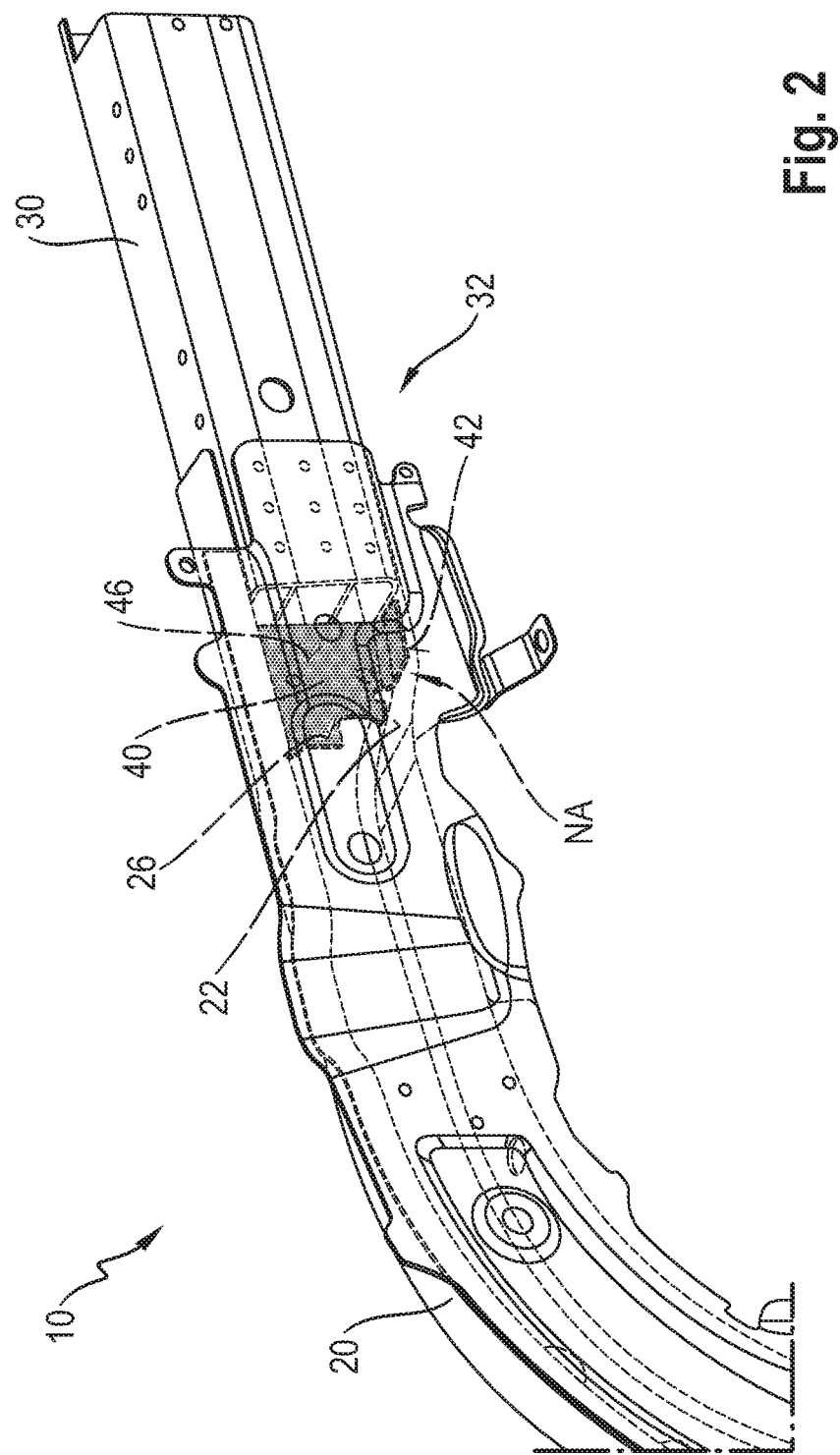
FIG. 2 shows a different view of the embodiment in FIG. 1.

FIGS. 1 and 2 show an open body part 10 having a structural component 20 to which a deformation component 30 for transmitting forces in normal operation is fastened. For a crash situation, an additional connecting functionality is provided with the aid of a connecting component 40. To this end, the connecting component 40 is connected to the deformation component 30 in a force-transmitting manner. The deformation component 30 is produced as an extruded profile made of aluminum.

If a crash situation now takes place, this crash situation will bring about force transmission to the deformation component 30 and thus to the connecting component 40. As a result of a corresponding short relative movement, a normal spacing NA between corresponding contact surfaces 42 of the connecting component 40 and mating contact surfaces 22 of the structural component 20 is overcome. As soon as this contact has occurred, separate attachment fastenings between the structural component 20 and deformation component 30 are relieved of load by the additional support.

As FIGS. 1 and 2 additionally show, provision is made of a perpendicularly arranged guide surface 46 which ensures an abutting guide functionality between the connecting component 40 and a mating guide surface 26 of the structural component 20.

Figure 3:
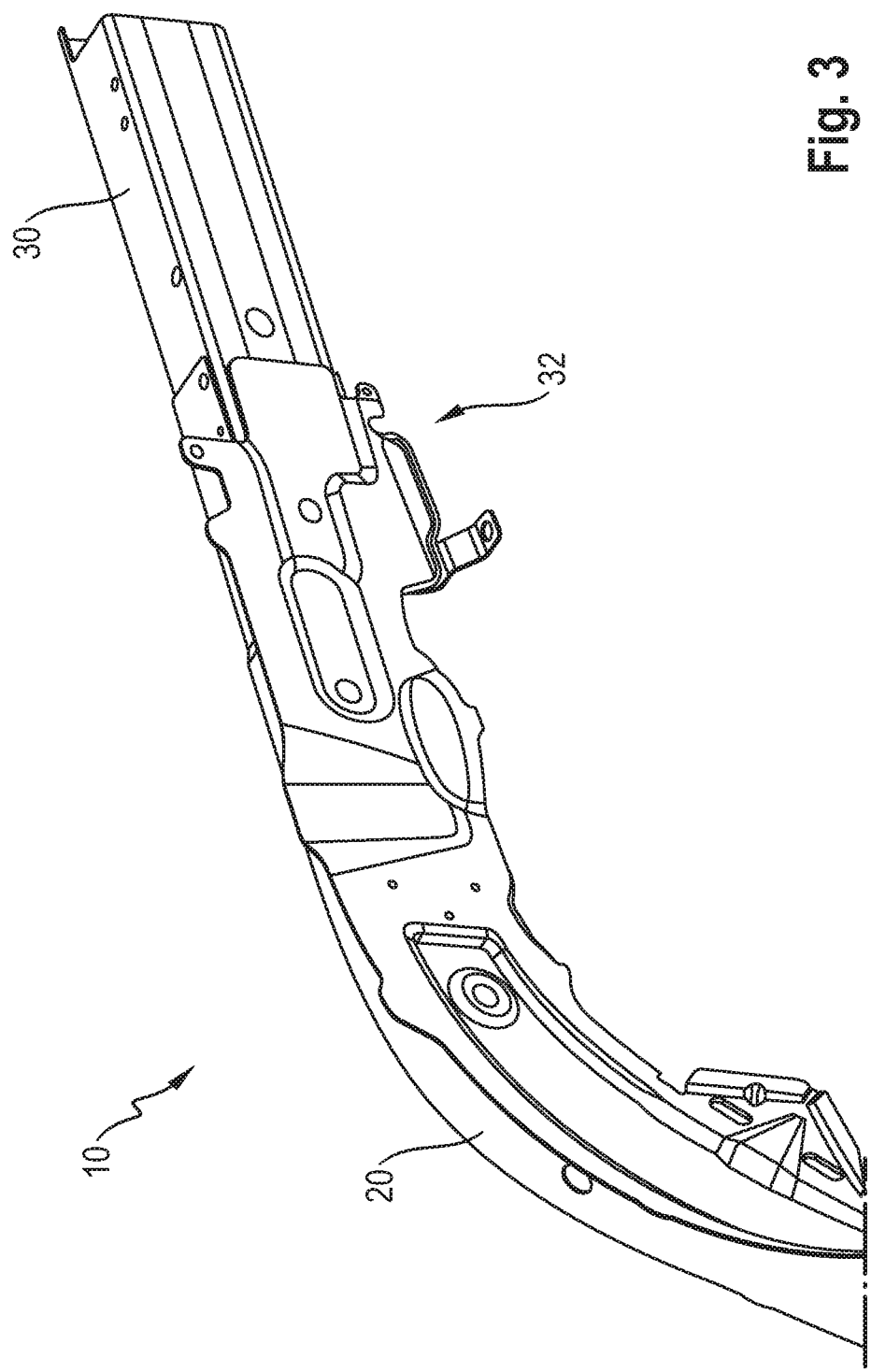
FIG. 3 shows the embodiment in FIGS. 1 and 2 with a closed structural component.

FIG. 3 shows the embodiment in FIGS. 1 and 2 with a corresponding closure possibility of the structural component 20. Thus, in this case, an overlap between an end portion 32 of the deformation component 30 and the structural component 20 is discernible by means of a metal plate. This results in improved protection of the internal connecting component 40, in particular with respect to soiling or blockage of the normal spacing NA.

Figure 4:
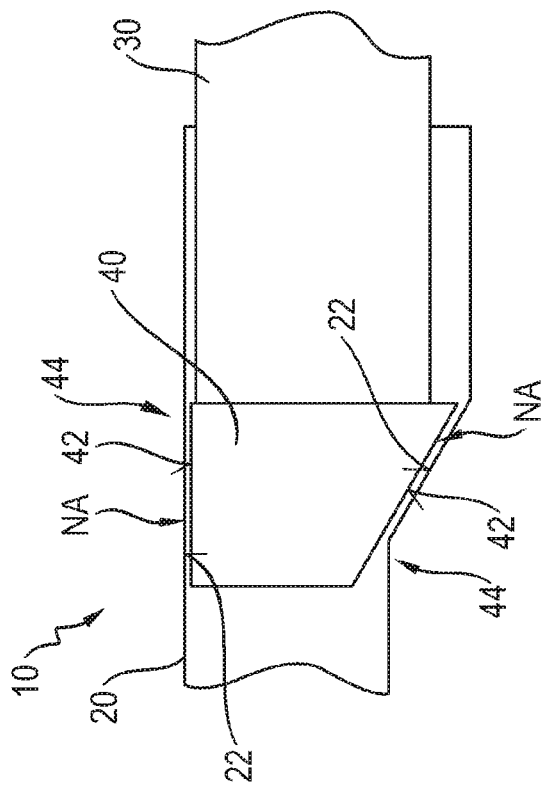
FIG. 4 shows a further embodiment of a body part according to the invention.
Figure 5:
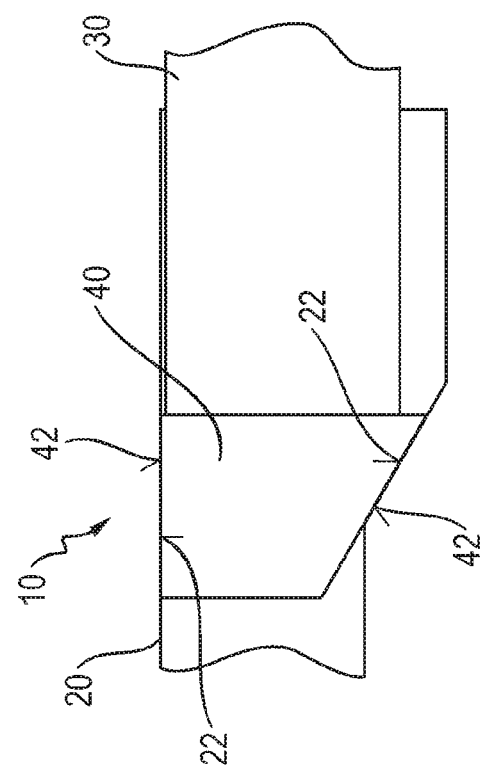
FIG. 5 shows the embodiment in FIG. 4 in the event of a crash.

FIGS. 4 and 5 show a further embodiment of a body part 10, wherein FIG. 4 illustrates the normal situation, in which a corresponding normal spacing NA with respect to the associated mating contact surfaces 22 exists between different contact surface portions 44 of the contact surface 40. FIG. 5 illustrates the crash situation in which this normal spacing NA has been overcome such that now a corresponding additional force transmission is available via the additional contact between the contact surface 42 and mating contact surface 22 in order to protect a separate connection between the structural component 20 and deformation component 30.

The above explanation of the embodiments describes the present invention only in the context of examples. Of course, individual features of the embodiments can be combined freely with one another, insofar as this is technically appropriate, without departing from the scope of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A body part of a vehicle, the body part comprising:
   a deformation component;
   a connecting component that is fastened to an end portion of the deformation component, the connecting component having a contact surface; and
   a structural component having a mating contact surface,
   wherein, in a first state of the body part, a spacing is formed between the contact surface of the connecting component and the mating contact surface of the structural component,
   wherein, when the spacing is formed between the contact surface of the connecting element and the mating contact surface of the structural component, the connecting component is not connected to the structural component, and
   wherein, in the event of a crash, the contact surface of the connecting component is configured to come into contact with the mating contact surface of the structural component to form force-transmitting contact between the connecting component and the structural component.

2. The body part as claimed in claim 1, wherein the contact surface of the connecting component and the mating contact surface of the structural component are configured for planar contact with one another.

3. The body part as claimed in claim 1, wherein the deformation component overlaps the structural component at an end portion of the deformation component.

4. The body part as claimed in claim 1, wherein the connecting component is formed separately from the deformation component.

5. The body part as claimed in claim 1, wherein the structural component is connected to the deformation component independently of the connecting component.

6. The body part as claimed in claim 1, wherein the contact surface of the connecting component has at least two contact surface portions which form an acute angle between one another.

7. The body part as claimed in claim 1, wherein the deformation component has lower mechanical stability than the structural component, with at least one of a predetermined deformation direction or deformation type.

8. The body part as claimed in claim 1, wherein the connecting component has a guide surface which butts in a guiding manner against a mating guide surface of the structural component so as to guide the contact surface of the connecting component into contact with the mating contact surface of the structural component in the event of the crash.

9. The body part as claimed in claim 1, wherein the deformation component is configured as an extruded profile having aluminum.

10. A connecting component of a body part of a vehicle for connecting a deformation component and a structural component, the connecting component comprising:
    a contact surface configured to come into contact with a mating contact surface of the structural component,
    wherein, in a first state of the body part, a spacing is formed between the contact surface of the connecting component and the mating contact surface of the structural component,
    wherein, when the spacing is formed between the contact surface of the connecting component and the mating contact surface of the structural component, the connecting component is not connected to the structural component, and
    wherein, in the event of a crash, the contact surface of the connecting component is configured to come into contact with the mating contact surface of the structural component to form force-transmitting contact between the connecting component and the structural component.

* * * * *